United States Patent [19]

Olson et al.

[11] Patent Number: 5,378,101
[45] Date of Patent: Jan. 3, 1995

[54] TAMPER-PROOF DRIVE SYSTEM BASED UPON MULTI-LOBULAR CONFIGURATION

[75] Inventors: Gregory R. Olson, Rockford; Clayton A. Allen, Loves Park, both of Ill.

[73] Assignee: Textron Inc., Providence, R.I.

[21] Appl. No.: 994,683

[22] Filed: Dec. 22, 1992

[51] Int. Cl.⁶ .................. F16B 23/00; F16B 35/06
[52] U.S. Cl. .................. 411/405; 411/404; 411/919
[58] Field of Search ............ 411/402, 405, 403, 404, 411/910, 919; 81/121.1

[56] References Cited

U.S. PATENT DOCUMENTS

| | | |
|---|---|---|
| 2,244,046 | 6/1941 | Bradshaw . |
| 2,248,695 | 7/1941 | Bradshaw . |
| 2,686,447 | 8/1954 | Vock et al. . |
| 2,770,998 | 11/1956 | Schwartz . |
| 3,241,408 | 3/1966 | McCauley . |
| 3,363,500 | 1/1968 | Simko . |
| 3,498,173 | 3/1970 | Wright . |
| 3,584,667 | 6/1971 | Reiland . |
| 3,654,832 | 4/1972 | Lana . |
| 3,874,258 | 4/1975 | Semola et al. . |
| 4,006,660 | 2/1977 | Yamamoto et al. ........ 411/405 |
| 4,027,572 | 6/1977 | Burge . |
| 4,170,918 | 10/1979 | Burge . |
| 5,137,407 | 8/1992 | Yamamoto .............. 411/405 X |
| 5,279,190 | 1/1994 | Goss et al. .............. 411/403 X |

FOREIGN PATENT DOCUMENTS 556145 9/1943 United Kingdom .

OTHER PUBLICATIONS

Saab 900 Service Manual for Manual Transmissions (1979–1988) p. 432-2.

*Primary Examiner*—Neill R. Wilson
*Attorney, Agent, or Firm*—Trexler, Bushnell, Giangiorgi & Blackstone, Ltd.

[57] ABSTRACT

A tamper-proof drive system including a drive tool and a complementary nut or fastener drive head each having a body defining a central axis and a drive portion formed in an end surface of the body about the central axis. The drive portion defines a plurality of symmetrical lobes in a circular array. The lobes are defines by three series of arcuate surface, two of which may be generated from circular or elliptical configurations while the intermediate surface is partially circular.

21 Claims, 3 Drawing Sheets

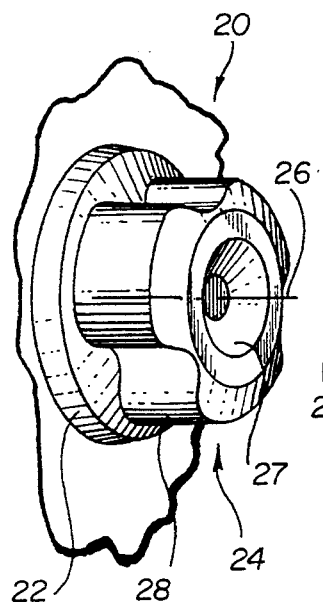
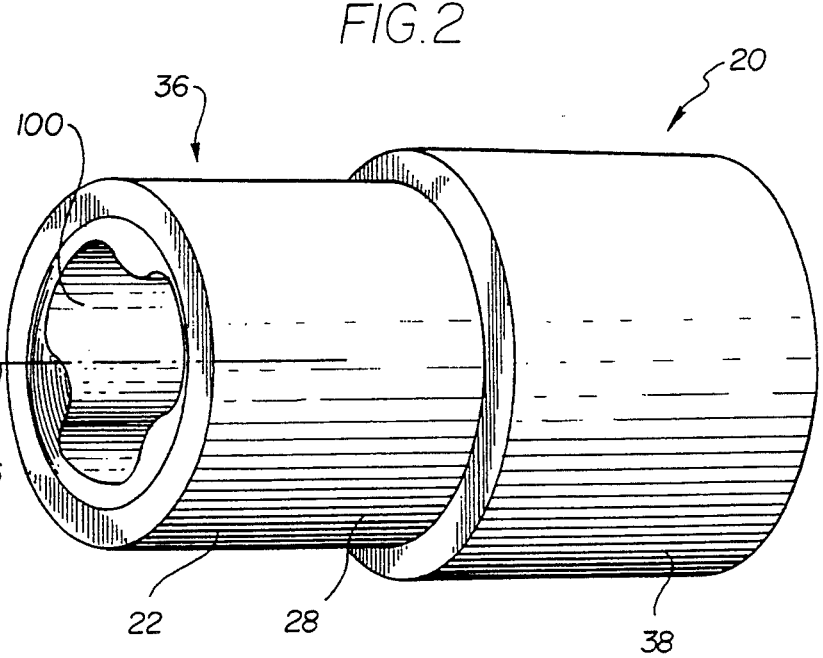
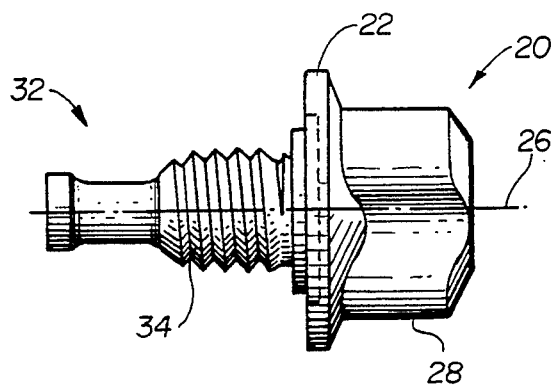
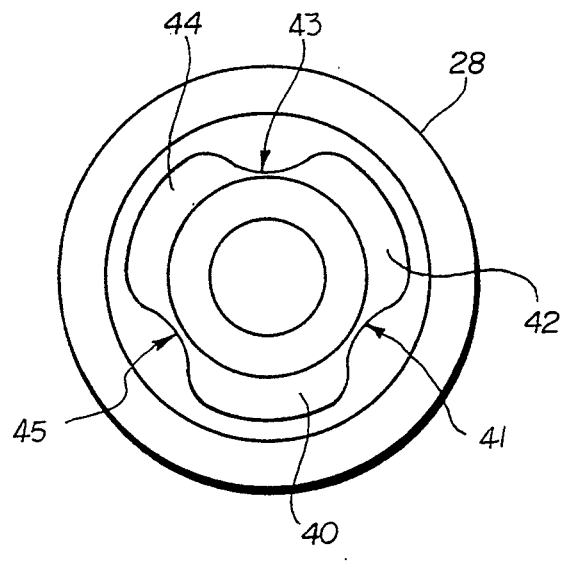

TAMPER-PROOF DRIVE SYSTEM BASED UPON MULTI-LOBULAR CONFIGURATION

BACKGROUND OF THE INVENTION

The present invention is directed generally to the fastener arts, and more particularly to a novel and improved tamper-proof drive system for fasteners. Still more particularly, the present invention is directed to an improved drive system of the multi-lobular configuration, for example, similar to the drive systems generally known in the trade as the TORX ® and the TORX PLUS ™ DRIVE SYSTEMS.

The well-known TORX ® fastener and driver system is the subject matter of U.S. Pat. No. 3,584,667 comprises a generally six-lobed or "hexlobular" configuration wherein the curved surfaces which define the flutes and lobes are generated from arcuate configurations. The TORX PLUS ™ drive system is also a multi-lobular configuration, however, with this particular system the flutes and lobes are generated using elliptical rather than arcuate geometric configurations. The TORX PLUS ™ drive system is disclosed in U.S. patent application Ser. No. 07/777,644, filed Oct. 16, 1991. The disclosure of the TORX ® U.S. Pat. No. 3,584,667 and said application Ser. No. 07/777,644 are incorporated herein by reference.

More particularly, these drive systems comprise complementary fastener drive heads and driving tools that define lobes and flutes centered about the six apices of a regular hexagon. These lobes and a similar series of intervening flutes or inwardly curved surfaces advantageously define a number of advantages, such as improved efficiency in converting applied force to driving torque due to the extremely low drive angles achieved, improved structural integrity due to a lower radial force components, etc., over other prior art drive systems.

With standard tamper-proof drive systems only drive tools specifically designed for complementary use with the fastener drive heads of the system may be successfully employed in rotating or driving the fastener. However, in a hexlobular system, such as the TORX ® or TORX PLUS ™ systems, this is not completely accurate. The generally symmetrical and regular hexagonal disposition of the internal lobes and flutes of the drive system results in diametrically opposed lobes and flutes. Accordingly, a conventional straight blade-type tool, such as a conventional screw drives could conceivably be inserted into the recess and utilized to rotate a fastener provided with such a drive head configuration. One solution to remedy this problem, is to prevent insertion of a blade-type drive tool by providing a post or cylindrical protrusion substantially centered in the recess of the drive head and a complementary central cylindrical recess is then formed in the driving tool. Hence, with such a protrusion and complementary recess, a standard blade-type tool could no longer be interfitted within a recessed drive head.

While the foregoing tamper-proof systems have found widespread acceptance, problems have been encountered in adapting this system to relatively small fasteners. More specifically, small fasteners that are often used for assembly of consumer electronic products employ even smaller drive heads and drive recesses and it has been found difficult and at times impossible reliably to form the necessary tamper-proof protrusions and corresponding recesses. In this regard, due to the small size of the drive tool, the removal of material to form a complementary recess removes so much material, that the strength of the tool is rendered insufficient for reliable and repeated operations. As to the fastener drive recess, the size of the post or protuberance that is required is so small that the post is difficult to form with standard cold heading processes, and even when formed is so structurally weak that it can be bent or fractured or otherwise rendered ineffective for its intended purpose. In contrast, the advantageous features of the TORX ® and TORX PLUS ™ drive systems are the reliability over a long service life, the efficient conversion of applied force to driving torque and attendant resistance to breakage and damage in long term operation of the drive tools.

As such, the present invention was developed to retain the advantages and improved features of the TORX ® and TORX PLUS ™ drive systems, yet provide a tamper-proof arrangement that can be used with relatively small fasteners.

OBJECTS AND SUMMARY OF THE INVENTION

It is a general object of the invention to provide a novel and improved tamper-proof drive system.

A more particular object is to provide such a tamper-proof drive system that may be simply and reliably formed on a broad range of sizes of fasteners and complementary tools, down to sizes heretofore not obtainable in some prior art tamper-proof systems.

A related object is to provide a tamper-proof system of the foregoing type that substantially precludes rotation of a fastener by any tool other than a tool of complementary configuration.

A further object is to provide a drive system of the foregoing type that is relatively simple and inexpensive in its design and manufacture and yet highly reliable in operation.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is a perspective view of a nut in accordance with the present invention;

FIG. 2 is a side view of a fastener in accordance with the present invention;

FIG. 3 is a perspective view of a drive tool in accordance with the present invention;

FIG. 4 is a schematic sketch or diagram illustrating the general shape of the features of one form of drive system of the present invention;

DETAILED DESCRIPTION OF THE PREFERRED EMBODIMENT

Figure 5:
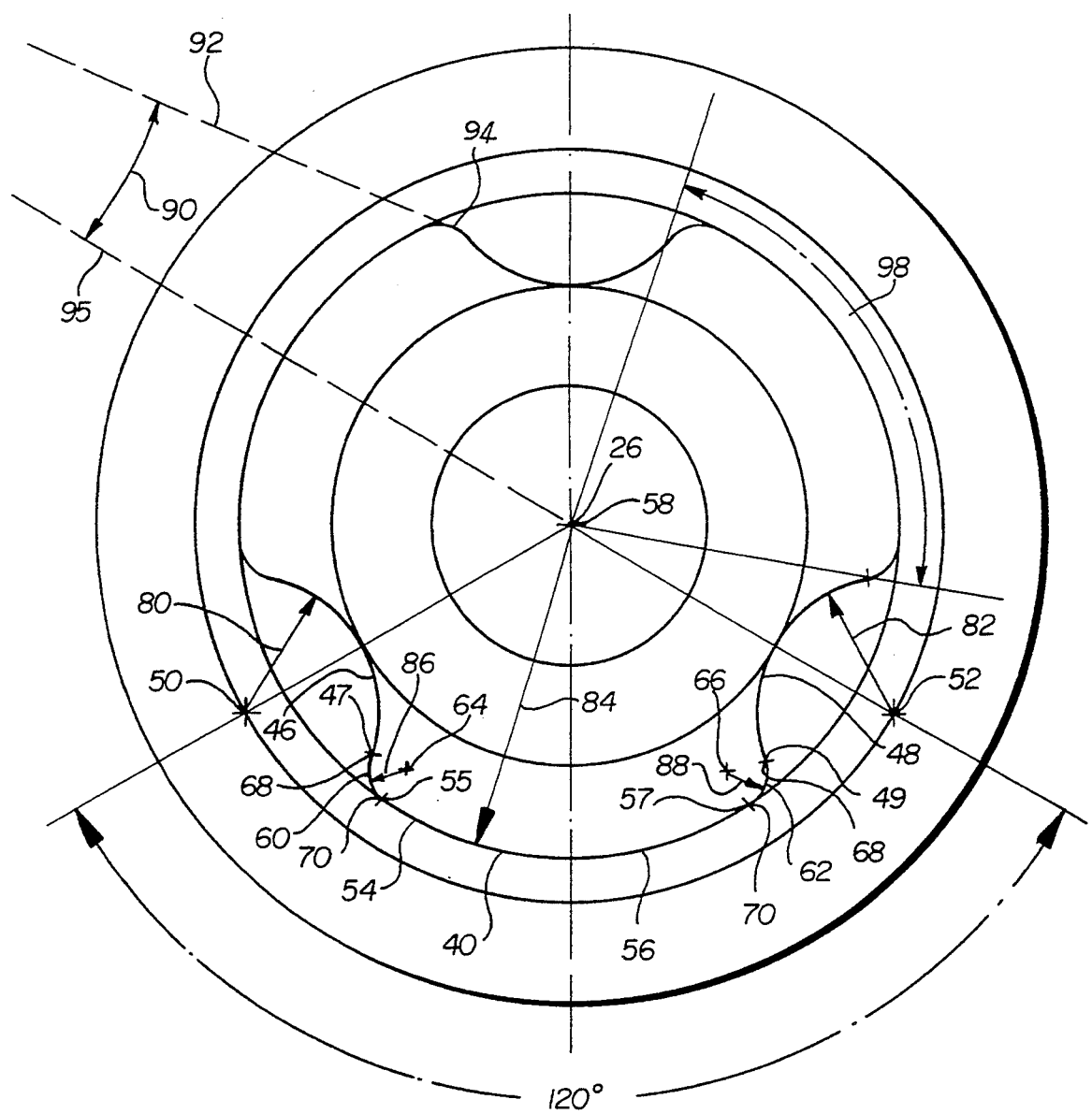
FIG. 5 is a schematic sketch or diagram illustrating in greater detail some of the geometric features of the drive system of FIG. 4.

While the invention may be susceptible to embodiment in different forms, there is shown in the drawings, and herein will be described in detail, specific preferred embodiments with the understanding that the present disclosure is to be considered an exemplification of the principles of the invention, and is not intended to limit the invention to that as illustrated and described herein.

Referring now to the drawings, the invention will be described and illustrated primarily with regard to the TORX ® type drive system wherein the arcuate surfaces are generated from radii and, as such, are partially circular. This embodiment is illustrated in FIGS. 1-5. FIG. 6 illustrates a modified form of the invention wherein certain of the arcuate surfaces are generated from elliptically configured surfaces. As such, a novel and improved tamper-proof drive system in accordance with the present invention is illustrated.

The drive system of FIGS. 1-5 is generally comprised of an article 20 having a body 22 with a lobular configuration at one end, as will be described in greater detail herein. The drive system may take any of several forms as illustrated by the embodiments in the FIGS. In FIG. 1, the drive system is shown as a nut 24 generally comprising a body 22 defining a central axis 26. A drive head portion 28 having a lobular configuration is formed at an end surface of the nut body 22 about the central axis 26. The nut 24 has an internally threaded bore 30 formed in its drive head 28. FIG. 2 illustrates a typical drive tool 36 for driving the fastener 24 of FIG. 1. In this regard, while the nut 24 has an external configuration, the drive tool 36 is provided with a correspondingly shaped internal configuration or recess. In FIG. 3, the drive system of the invention is shown on an externally threaded fastener 32 having a threaded shank 34 generally comprising a body 22 defining a central axis 26. A drive head portion 28 having a lobular configuration, as clearly shown in FIG. 4, is formed at an end surface of the body 22 and about the central axis 26. In FIG. 2, the drive tool 36 generally comprising a shank portion 38 defining a central axis 26 and a torque transmitting head portion 28 coaxial with the shank portion 38. This torque transmitting head portion 28 is provided with a lateral surface of a lobular configuration that is complementary with a lobular configuration of the nut 24 or fastener 32 in order to impart rotation.

The drive head 28 in any of the embodiments of FIGS. 1-5 may protrude from the end of the body 22 as an external portion or may be formed as an internal recess. For example, if the nut 24 or fastener 32 have an external drive head 28, the drive tool 36 will have a drive head recess that is complementary to the external drive head of the nut 24. Alternately, if the fastener 32 and nut 26 have a drive recess, the drive tool 36 will have an external drive head that is corresponding or complementary to the drive head recess of the fastener 32. Therefore, the FIGS. are not intended to limit the scope of the present invention.

Referring to FIG. 4, it will be seen that the drive head 28 generally defines three lobular configurations or lobes 40, 42 and 44. Disposed intermediate the lobes 40, 42 and 44 are a series of flute-like configurations, designated generally 41, 43 and 45. It should be noted that each lobe or lobular configuration 40, 42 and 44 is made up on concaved and convex portions and it is the concave portions of each adjacent lobe which serves to define the flutes designated 41, 43 and 45. For purposes of discussion, only the lobular configuration 40 will be discussed in detail, with opposed portions thereof define a portion of the flutes 41 and 45, respectively. With this, and the fact that lobular configurations 42 and 40 are of similar shape to the configuration 40, in mind attention is directed to FIG. 5.

The lobe 40 is defined by opposed inwardly curved or concaved curvilinear arcuate surface portions 46 and 48. It will be understood in this regard that the directions inward and outward refer generally to radial directions with respect to the central axis 26. The opposed surface portions 46 and 48 define respective axes of curvature at 50 and 52 that extend generally parallel with each other and the central axis 26. The axes of curvature 50 and 52 are disposed entirely radially outward of a radially outermost extent 54 of the respective lobular configurations 40, 42 or 44. Each opposed surface portion 46 and 48 has a terminuses 47 and 49 that will merge with the next surface portion of the lobular configuration as described herein. The opposite terminus portions of the surface 46 and 48 are associated with the lobes 44 and 42, respectively.

The lobe 40 also includes an outer or end arcuate surface portion 56 that is a convexed curvilinear or radially outwardly curved surface portion 56 substantially generated from the central axis 26 in a circular array between the surface portions 46 and 48. The end surface portion 56 has an axis of curvature 58 that is generally collinear with the central axis 26 and defines a radius being the outermost extent 54 of the lobular configuration 40. The end surface portion 56 has terminuses 55 and 57 that will merge with the next or adjacent surface portions as described herein.

Finally, the lobe 40 is further defined by intermediate opposed outwardly curved or convexed curvilinear arcuate surface portions 60 and 62 that curve generally outwardly with respect to the central axis 26 of the body 22, which join or link surface portion 56 with the concaved surface portions 46 and 48. The opposed surface portions 60 and 62 define respective axes of curvature 64 and 66 that extend generally parallel with each other and with the axes 50, 52 and 58 and the central axis 26. The axes of curvature 64 and 66 of the surfaces 60 and 62 are disposed entirely radially inward of the radially outermost extent 54 of the respective lobular configuration 40, 42 or 44. Moreover, each of the intermediate surface portions 60 and 62 merge smoothly at its terminus 68 with a respective concaved curvilinear surface portion's terminus 47 and 49 on one side and also merges smoothly and tangentially at its terminus 70 with respective convexed curvilinear surface portion's terminus 55 or 57 on the other side. By using the term "smoothly", it will be understood to mean that no break or interruption occurs due to the merging of the surfaces of the configuration.

Accordingly, the lobular configurations 40, 42 and 44 can be viewed as defining generally a first series of spaced apart concaved curvilinear surfaces 46 and 48 that are directed radially inwardly with respect to the central axis 26. A second series of spaced apart convexed curvilinear surfaces 56 that are directed radially outwardly with respect to the central axis 26. Finally, a third series of convexed curvilinear surfaces 60 and 62 that are directed radially outwardly with respect to the central axis 26 wherein the third series 60 or 62 merges with respective first and second series surfaces portions 46, 48 and 56, respectively, on either side thereof. Thus, the first series 46 and 48 comprises the flutes and the second and third series 56, 60 and 62, respectively, form the lobes of the configuration.

Each of the first series of surfaces 46 and 48 has a radius 80 and 82 that is generally equal to each other.

Likewise, each of the second series of surfaces 56 has a radius 84 that is generally equal to each other. Finally, each of the third series of surfaces 60 and 62 has a radius 86 and 88 that is generally equal to each other. The radius 80 and 82 of the first series of surfaces 46 and 48 is smaller than the radius 84 of the second series of surfaces 58, but larger than the radius 86 and 88 of the third series of surfaces 60 and 62. This is necessary in order to achieve a small drive angle as will be discussed in greater detail herein.

The lobes 40, 42 and 44 are symmetrically formed and disposed generally 120° apart. However, the invention may vary somewhat from this symmetrical form. For example, more than three lobes may be used as long as the novel radial configurations of the lobes and flutes are maintained. Thus, lobular configurations of alternate design are contemplated, or being included within the scope of the present invention. Also, since the configuration is symmetrical, a forming tool for manufacturing the drive head 28 is easier to create, and therefore, less costly.

Attention is now directed to a relatively small drive angle indicated at reference numeral 90, which is preferable on the order of substantially 10°-20°, and preferably approximately 15°. As the drive angle 90 is increased substantially above 20°, the efficiency of the drive coupling achieved by the system of the invention is believed to diminish very rapidly.

A substantially identical drive surface with this preferred drive angle 90 is defined at each of the lobes 40, 42 and 44 due to the novel radius configurations of the first, second and third series of surfaces. The drive angle 90 is generally defined as the angle formed by a plane 92 generally tangent to a line of contiguity 94 between first inwardly directed surface 64 and first outwardly directed surface 46, for example, of each lobe 40, 42 or 44. The drive angle 90 is formed by this line 94 or plane 92 and a second line or plane 95 that radially bisects the same lobe 40, 42 or 44. Thus, the present invention advantageously achieves a low drive angle 90.

Preferably, each of the lobes or lobular configurations 40, 42 and 44 subtends an arc of radius about the central axis 26 substantially on the order of 70° to 80° as shown by reference numeral 98. This assures that a substantial amount of material of a complementary article 20 is engaged in a recess formed by these lobes. Thus, the present invention also advantageously achieves a large surface over which driving engagement can occur.

In accordance with the present invention, no two of the lobular configurations or lobes 40, 42 and 44 have diametrically opposed flats with respect to the central axis 26. In the preferred embodiment, as illustrated in the FIGS., the nut 24 or fastener 32 has an external drive head 28, and the drive tool 36 has an internal recess 100. When the articles 20 are in this configuration, a gripping device, such as a pair of pliers, will not be able to rotate the nut 24 or fastener 32. While the pliers can grasp the nut 24 or fastener 32, the pliers will not be able to rotate the nut 24 or fastener 32 because they will slip off of the lobes 40, 42 or 44 due to the lobes configuration and drive angle 90. Thus, while engagement may be attained, the engagement will not be "operative" in nature.

Alternatively, the nut or fastener may have a recess and the drive tool may have an external drive head. If this is being used, a straight blade-type driving tool will not be able to achieve an operative engagement. While a blade-type driver may be disposed in the recess and can engage two lobular configurations, the straight blade-type driving tool will not be able to rotate the nut or fastener.

In the embodiments described above, it can be seen that any attempt to use a standard hexlobular driver will be ineffective, as the position of the first series of surfaces 46 and 48 will prevent operative engagement. Moreover, it can be seen from the foregoing that only a driving tool of a substantially complementary configuration will be operatively engageable. Thus, the externally protruding drive head 28 of the nut 24, fastener 32 or drive tool 36 does not need a recess, and therefore, the article 20 maintains a high strength.

Hence, the present invention comprises a novel lobular configuration 40, 42 and 44 for a tamper-proof drive system. The novel lobular configuration 40, 42 and 44 achieves a low drive angle 90 while maintaining a large area for operative engagement with a complementary tool 36. The novel configuration of the lobes 40, 42 and 44 also prevents operative engagement with a gripping device, such as a pair of pliers or a straight blade-type tool or a hexlobular tool. Furthermore, the strength of the nut 24, fastener 32 or drive tool 36 is also preserved due to this configuration.

Attention is now invited to FIG. 6, which as discussed above, illustrates a modified form of the invention wherein the drive surfaces, lobes and flutes on the driving head are generated from elliptically curved surfaces. In this regard, similar structural features will be identified by the same number as used previously, with the addition of a prime (') designation. As such, the driving head is indicated as 28' and discussion will be had with respect to the lobular configuration 40'.

With regard to FIG. 6, the outermost surface defining the lobular configuration 40' is surface 56'. This is the second series of surfaces with respect to this embodiment. Surface 56' is arcuate and partially circular being generated from central axis 58' and the radii 84'. This second series surface 56' has terminuses 55' and 57'.

Corresponding to the embodiment of FIGS. 1-5, the lobe 40' is also defined by opposed inwardly curved concaved arcuate surface portions 46' and 48'. These surfaces are of a partially elliptical configuration. With reference to surface 48, this surface is generated from an elliptical center 52' and is defined by the major and minor axes 82'a and 82'b. The surface 46' is similarly defined, however, its center and major and minor axes are not shown. The elliptical surfaces 46' and 48' however do define terminuses 47' and 49'.

The first series of surfaces 46' and 48' are joined to the second partially circular surface 56' by a pair of third surfaces 60' and 62'. This merger is smooth and preferably tangential. In this regard, each of the arcuate third surfaces 60' and 62' which provide the third series of surfaces, is also generated from an elliptical configuration, as opposed to the generally circular configuration of the surfaces 60 and 62. With respect to surface 62', this surface is generated from an elliptical center 66' and is defined by a major axis 88'a and a minor axis 88'b. The corresponding surface 60' is similarly formed, however, its center and major and minor axes have not been shown. The elliptical surfaces 60' and 62' each have terminuses which are designated 70' and 68'. These terminuses coincide with the terminuses 47' and 49' of the surfaces 46' and 48' defining the first series and also the terminuses 55' and 57' of the second partially circular surface 56'. As such, the third, elliptical surfaces 60' and 62 merge smoothly with both of the first surfaces 46' and 48' and also the second surface portion 56'. Preferably, the merger is tangential. Also with the elliptical configuration of FIG. 6, the elliptical axes or centers of the surfaces, 52' and 66' are disposed the same distance from the fastener center 58' and radially inward of surface 56'.

Figure 6:
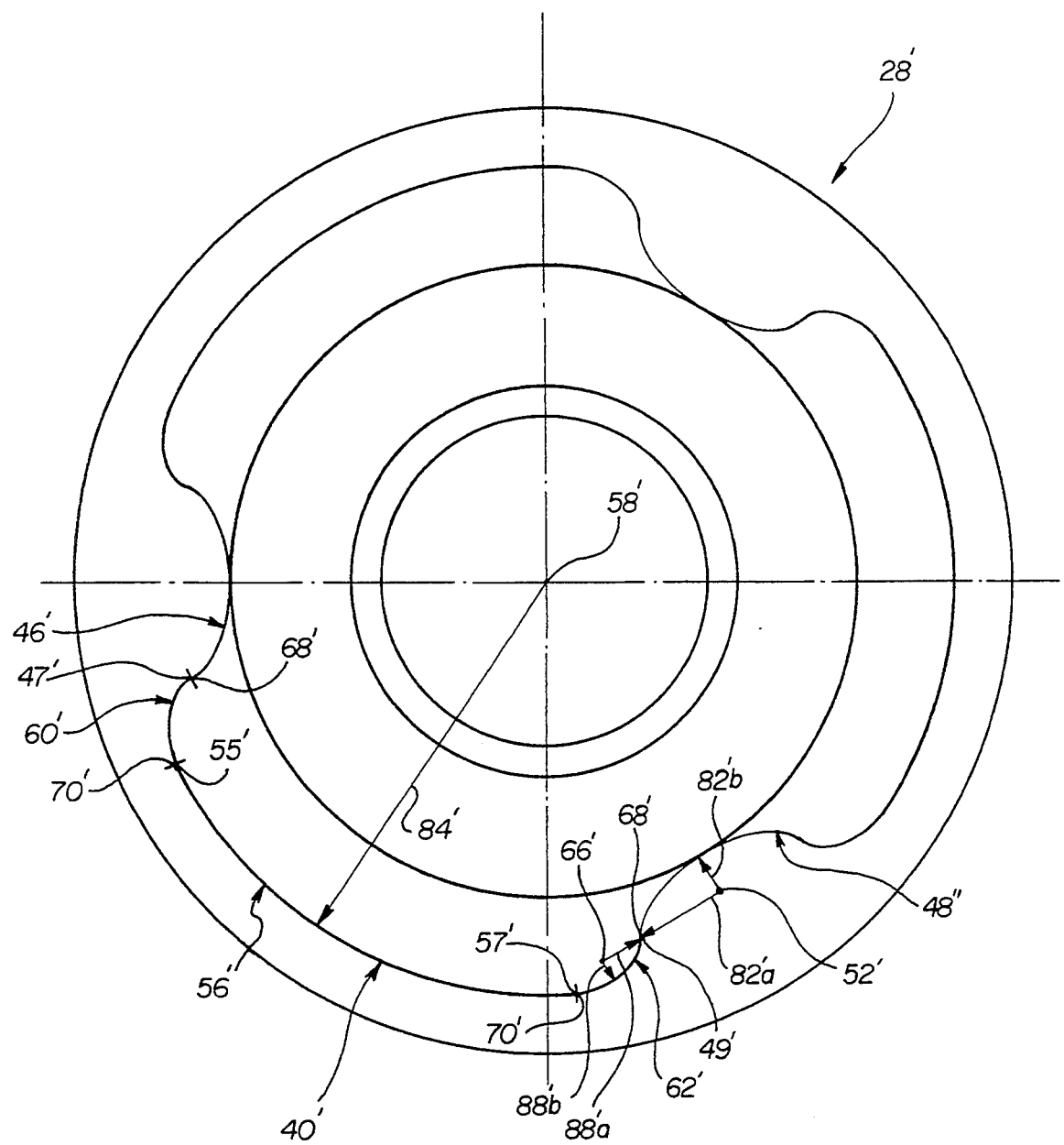
FIG. 6 is a view similar to FIG. 5, but illustrating the configuration of a drive system utilizing flutes and lobes generated from elliptical configuration.

While the configuration of FIG. 5 will provide a relatively low drive angle 90 on the order of 15°, the embodiment of FIG. 6 has been found to be even more efficient. This design attains a drive angle approaching zero. As such, virtually all of the applied force is converted to driving torque and there is little, if any, radial forces. It is believed that this design employing the elliptically formed flutes and lobes is the first drive system to attain such a low drive angle using only arcuate surfaces that merge smoothly is the absence of sharp corners.

Also, as is discussed in greater detail is the aforementioned pending application, the elliptical design of the TORX PLUS TM configuration does not lose its desirable characteristic with regard to drive angle and point of engagement, due to dimensional tolerances and fabrication tool wear.

What has been illustrated and described herein is a novel and improved tamper-proof drive system. While the invention has been illustrated and described herein with reference to preferred embodiments, the invention is not limited thereto. Those skilled in the art may device various changes, alternatives and modifications upon reading the foregoing descriptions. The invention includes such alternatives, changes and modifications insofar as they fall within the spirit and scope of the appended claims.

We claim:

1. A fastener member for use in a tamper-proof drive system wherein the fastener is adapted to be driven by a drive tool of complementary shape, the fastener including an axis and multiple lobular configurations disposed equidistant about the axis of the fastener, said lobular configurations being defined by structure including a series of axially extending drive surfaces for mating engagement with the drive surfaces on a complementary tool, said fastener structure defining the drive surfaces of each said lobular configurations including:
  a first series of arcuate surfaces, each having terminuses and being generated from a center which extends parallel to the fastener axis and is disposed approximately equidistant from the fastener axis about a circle generated from said fastener axis, each said surface of said first series having a configuration which are approximately equal to each other;
  a second arcuate surfaces generated from a common axis which is approximately coextensive with the fastener axis, such that said second surfaces includes such surfaces which are disposed generally on a common circle and intermediate said first series of surfaces, each said second surface having a radius of curvature which is approximately equal to each other and each said second curved surface defining terminuses;
  and a third series of arcuate surfaces including multiple pairs of arcuate surfaces with one said surface of each pair being associated with the terminus of one of said first series of surfaces and merging smoothly and tangentially therewith and not by a straight line portion, and one of said surfaces of each pair being associated with the terminuses of one of said second series of surfaces and merging smoothly therewith; the axes of the surfaces making up said third series of surfaces being disposed radially inward of the axis of said first series of surfaces, each said surface of said third series being similar and generated from the same geometric configuration.

2. A fastener member as recited in claim 1, wherein said first and third series of surfaces are arcuate, such that all of the surfaces of said first series are generated for equal radii and all of the surfaces of said third series are generated from equal radii, with the radii generating said first series being greater than the radii generating said third series.

3. A fastener according to claim 1, wherein said first and third series of surfaces are elliptical in configuration, with the major axis of the elliptical configuration from which said first series of surfaces is generated being greater than the major axis from which said third series of surfaces is generated.

4. A fastener member according to claim 1, wherein said lobular configurations equals three in number.

5. A fastener member according to claim 1, wherein said first series of arcuate surfaces are disposed at approximately 120° to each other about said circle.

6. A fastener member according to claim 1, wherein said lobular configuration defines a recess.

7. A fastener member according to claim 1, wherein said first series of surfaces are concaved in a direction toward the central axis while said second and third series of surfaces are convexed with respect to the central axis of the fastener.

8. A fastener member according to claim 7, wherein said lobular configuration defines an external driving head.

9. A fastener member according to claim 8, wherein said lobular configurations equals three in number.

10. A fastener member adapted for use in a tamper-proof drive system, wherein the fastener is adapted to be driven by a drive tool of complementary shape, the fastener including an axis and multiple lobular configurations disposed equidistant about the axis of the fastener, said lobular configurations being defined by a series of axially extending surfaces including:
  a first series of arcuate surfaces, each having terminuses and being defined by an axis of curvature which extends parallel to the fastener axis, each having a radius of curvature;
  a second series of arcuate surfaces, each having terminuses, said second series of arcuate surfaces being generated from a common axis which is approximately coextensive with the fastener axis such that said second series includes multiple arcuate surfaces which are disposed generally on a common arc and intermediate said first series of surfaces, each having a radius of curvature being greater than the radius of curvature of said first series of surfaces;
  and a third series of arcuate surfaces including multiple pairs of arcuate surfaces with one arcuate surface of each pair being associated with the terminus of one of said first series of surfaces and merging smoothly and tangentially therewith and not by a straight line portion, and one of said surfaces of each pair being associated with the terminus of one of said second series of surfaces and merging smoothly therewith, each having axes of curvature which are disposed radially inward of the axes of said first series of surfaces, and each having a radius of curvature being smaller than the radius of curvature of said first and said second series of surfaces; whereby said first, second and third series of surfaces cooperate to define a lobular configuration with flutes intermediate the respective lobes.

11. A fastener member according to claim 10, wherein each radius of curvature of said first series of arcuate surfaces is approximately equal to each other, each radius of curvature of said second series of arcuate surfaces is approximately equal to each other and, each radius of curvature of said third series of arcuate surfaces is approximately equal to each other.

12. A fastener member according to claim 9, wherein said first series of arcuate surfaces are disposed at approximately 120° to each other about said circle.

13. A fastener member according to claim 9, wherein said first series of surfaces are concaved in a direction toward the central axis while said second and third series of surfaces are convexed with respect to the central axis of the fastener.

14. A drive tool adapted for use in a tamper-proof drive system, wherein the tool is adapted to drive, a fastener of complementary shape, the tool having a shank defining a central axis and a torque-transmitting head portion coaxial with said shank portion and provided with a lateral surface at the end thereof opposite said shank portion comprising a plurality of lobular configurations disposed equidistant about the axis of the tool, said lobular configurations being defined by a series of axially extending surfaces including;
a first series of arcuate surfaces, each having terminuses and being generated from a center which extends parallel to the tool axis, each surface having a curvature which are approximately equal to each other;
a second arcuate surface defining a second series, each having terminuses, said second arcuate surface being generated from a common axis which is approximately coextensive with the tool axis such that said second series includes multiple arcuate surfaces which are disposed generally on a common arc and intermediate said first series of surfaces, each having a radius of curvature being approximately equal to each other;
and a third series of arcuate surfaces including multiple pairs of arcuate surfaces with one surface of each pair being associated with the terminus of one of said first series of surfaces and merging smoothly and tangentially therewith, and one of said surfaces of each pair of said third series being associated with the terminus of one of said second series of surfaces and merging smoothly therewith, each having a center which does not extend radially outward beyond the center of said first series of surfaces, and each being approximately of equal configuration to each other.

15. A tool according to claim 14, wherein said lobular configurations equals three in number.

16. A tool according to claim 14, wherein said first series of surfaces are concaved in a direction toward the central axis while said second and third series of surfaces are convexed with respect to the central axis of the tool.

17. A tool according to claim 14, wherein said first and third series of surfaces are arcuate, such that all of the surfaces of said first series are generated for equal radii and all of the surfaces of said third series are generated from equal radii, with the radii generating said first series being greater than the radii generating said third series.

18. A tool according to claim 14, wherein said first and third series of surfaces are elliptical in configuration, with the major axis of the elliptical configuration from which said first series of surface is generated being greater than the major axis from which said third series of surface is generated.

19. A fastener member for use in a tamper-proof drive system wherein the fastener is adapted to be driven by a drive tool of complementary shape, the fastener including an axis and multiple lobular configurations disposed equidistant about the axis of the fastener, said lobular configurations being defined by structure including a series of axially extending drive surfaces for mating engagement with the drive surfaces on a complementary tool, said fastener structure defining the drive surfaces including:
a first series of arcuate surfaces, each having terminuses and being defined by an elliptical configuration having a center which extends parallel to the fastener axis and is disposed approximately equidistant from the fastener axis about a circle generated from said fastener axis, each said elliptical surface of said first series having a configuration which is approximately equal to each other;
a second arcuate surface generated from a common axis which is approximately coextensive with the fastener axis and defines a second series of such surfaces, such that said second series of surfaces are disposed generally on a common circle and intermediate said first series of surfaces, each said surface of said second series having a radius of curvature which is approximately equal to each other;
and a third series of arcuate surfaces including multiple pairs of arcuate surfaces defined by an elliptical configuration with one said surface of each pair being associated with the terminus of one of said first series of surfaces and merging smoothly and tangentially therewith, and one of said surfaces of each pair being associated with the terminus of one of said second series of surfaces and merging smoothly therewith; the axes of curvature of the surfaces making up said third series of surfaces being disposed radially inward of the center of said first series of surfaces, each said elliptical surface of said third series having major and minor axes which are less than the major and minor axes of said first series of elliptical surfaces.

20. A fastener according to claim 19, wherein said lobular configuration defines a recess.

21. A fastener according to claim 19, wherein said lobular configuration defines an external driving head.

* * * * *